United States Patent [19]

Viertel et al.

[11] 4,272,118
[45] Jun. 9, 1981

[54] ELECTRIC CONNECTION TO SUN VISOR FOR AUTOMOTIVE VEHICLES, OR THE LIKE

[75] Inventors: Lothar Viertel, Wuppertal; Manfred Nowak, Solingen, both of Fed. Rep. of Germany

[73] Assignee: Gebr. Happich GmbH, Fed. Rep. of Germany

[21] Appl. No.: 9,406

[22] Filed: Feb. 5, 1979

[30] Foreign Application Priority Data

Feb. 24, 1978 [DE] Fed. Rep. of Germany ....... 2703447

[51] Int. Cl.³ ............................................. B60J 3/00
[52] U.S. Cl. ............................. 296/97 R; 296/97 H; 339/10; 339/89 R
[58] Field of Search ................... 296/97 R, 97 H; 339/89 R, 276, 195, 196, 5 R, 5 S, 8 R, 8 P, 8 PB, 10

[56] References Cited

U.S. PATENT DOCUMENTS

| | | | |
|---|---|---|---|
| 2,798,210 | 7/1957 | Keitel | 339/5 R |
| 3,059,202 | 10/1962 | Huber | 339/5 R |
| 3,193,323 | 7/1965 | Herr et al. | 296/97 H |
| 3,396,586 | 8/1968 | Maclin et al. | 339/5 R |
| 3,550,061 | 12/1970 | Sukup | 339/8 R |
| 3,926,470 | 12/1975 | Marcus | 296/97 H |
| 3,964,815 | 6/1976 | McDonough | 339/276 T |
| 4,003,616 | 1/1977 | Springer | 339/8 R |
| 4,174,864 | 11/1979 | Viertel et al. | 296/97 H |

FOREIGN PATENT DOCUMENTS 2376766 8/1978 France ............................ 296/97 H Primary Examiner—John J. Love
Assistant Examiner—Ross Weaver
Attorney, Agent, or Firm—Ostrolenk, Faber, Gerb & Soffen

[57] ABSTRACT

The invention concerns a novel electric connection to a light source, or the like, on a sun visor for a vehicle. At one edge of the sun visor body, there is a pivot pin that is supported in a preferably plastic support that is held in the sun visor body. The pivot pin is received in a socket held to the body of the vehicle and which includes electtric contacts in it. An electric lead extends through the pivot pin and leads to the light source. The pivot pin has a radially extending groove. A contact element extends from outside the groove into the groove for contacting the lead therein. The contact element extends out of the groove and may be wrapped around the pivot pin for engaging a corresponding contact element in the socket, which contact element is connected, in turn, to an electric wire in the vehicle electrical system. Various forms of contact elements for the pivot pin are disclosed. This includes a sleeve positioned in the bore in the pivot pin and having arms projecting out of the groove of the pivot pin to the exterior of the pivot pin for contacting the contact element in the socket. Alternatively, a C-shaped claw member is wrapped around the pivot pin, and the longitudinal edges of the claw project through the groove so that at least one of the edges of the claw contacts the wire in the bore of the pin. In another embodiment, the pivot pin has two diametrically opposite grooves and each longitudinal edge of the claw projects into a respective groove.

18 Claims, 7 Drawing Figures

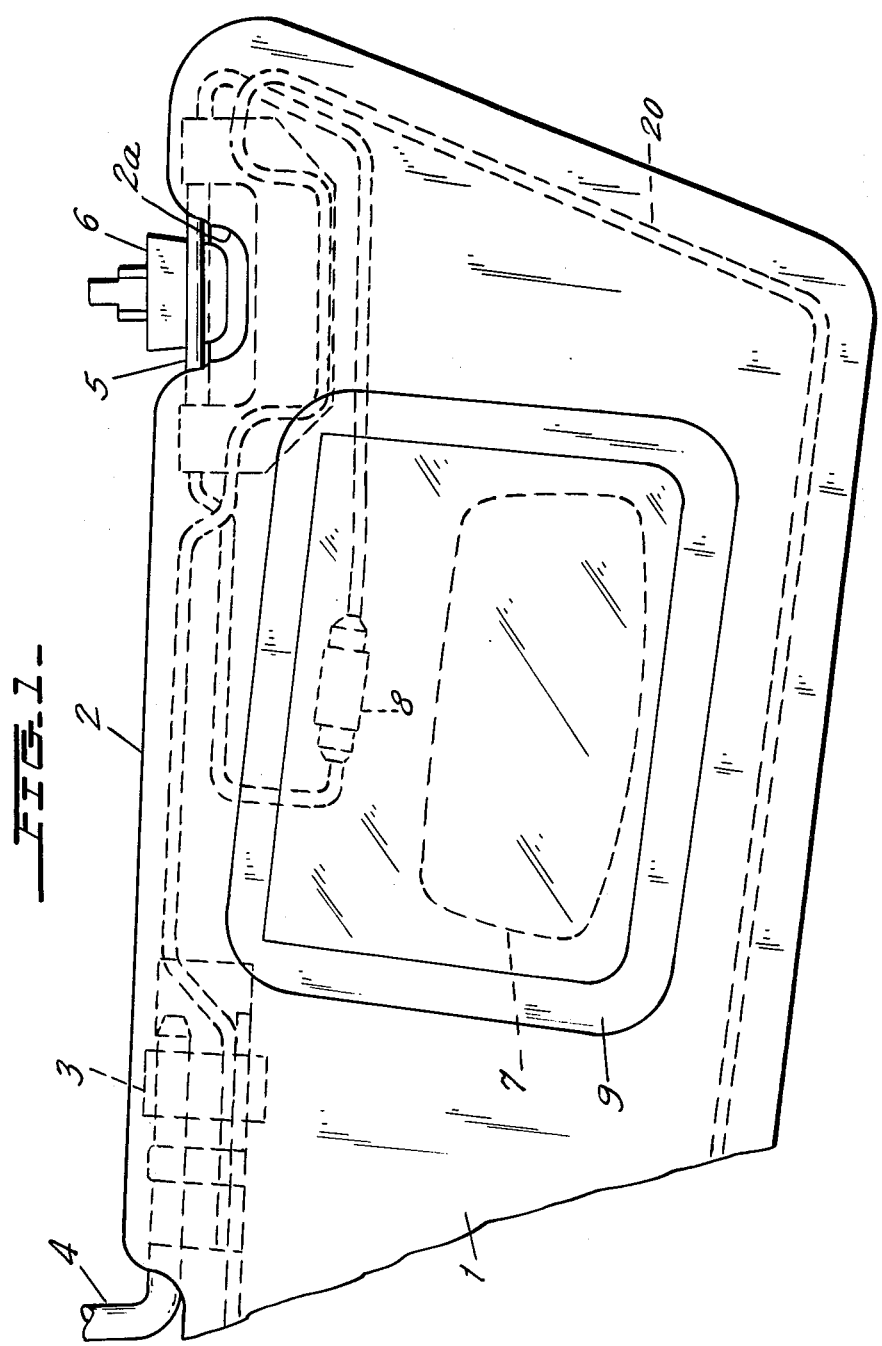

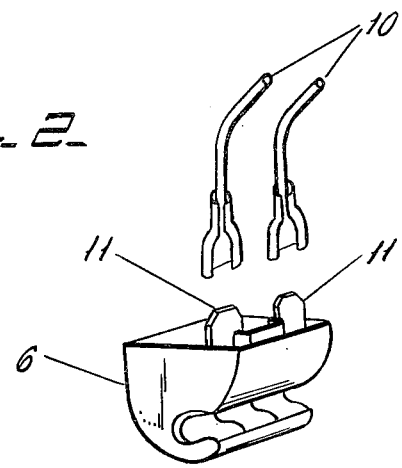
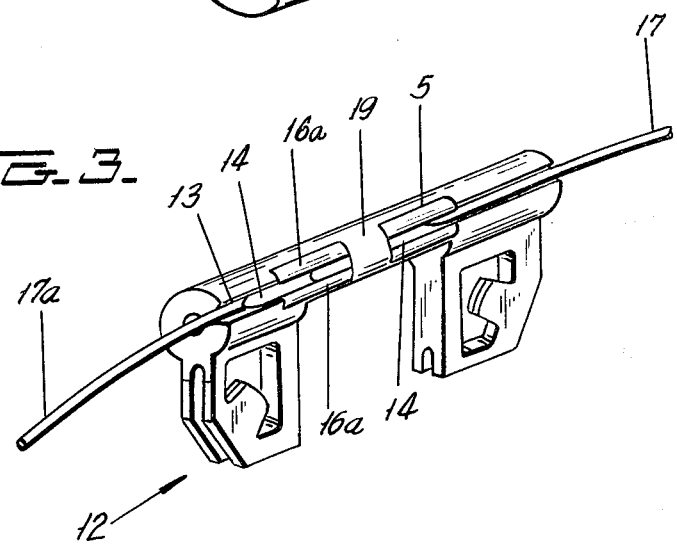
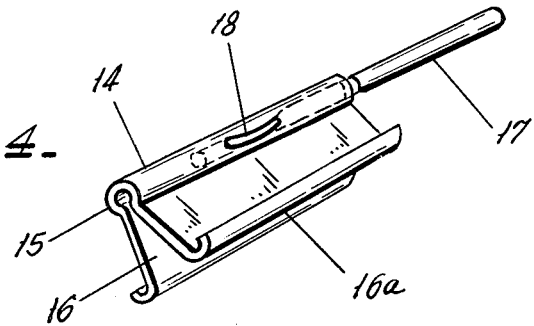

ELECTRIC CONNECTION TO SUN VISOR FOR AUTOMOTIVE VEHICLES, OR THE LIKE

This invention relates to a sun visor for automotive vehicles and more particularly to an electrical connection to the sun visor through a swivel support thereof.

BACKGROUND OF THE INVENTION

For an understanding of the sun visor which utilizes the invention, refer to allowed U.S. Application Ser. No. 866,992, filed Jan. 5, 1978, now U.S. Pat. No. 4,174,864 incorporated herein by reference.

Such a sun visor has a swivel support which is arranged in the region of one end of its upper longitudinal edge. It also has a housing and sun visor pivot pin and an outer support pivot pin arranged in the region of the other end of its upper longitudinal edge. The latter pin is detachably connected with an outer support housing of plastic. The sun visor carries a mirror, which is provided with an electrified source of light positioned for illuminating the mirror. An electric current lead wire is connected between the light source and the electrical system of the vehicle. A ground wire is also connected to the light source.

The outer support housing is provided with at least one contact element to which an electric wire of the electrical system of the vehicle can be connected, on the one hand, and which, on the other hand, makes contact with the outer-support pivot pin to which at least the current lead wire for the source of light is connected.

In the aforesaid application Ser. No. 866,992, the outer-support pivot pin can alternatively have two contact elements with an insulator arranged between them. For this purpose, the outer-support pivot pin is developed in a telescopic fashion. It is then comprised of a central plastic part with journals formed on both ends and having metal sleeves arranged thereon. A coil spring is provided between the plastic part and one metal sleeve. This multipart outer support pivot pin is expensive to manufacture and is relatively difficult to mount.

SUMMARY OF THE INVENTION

An object of the present invention is to simplify the manufacture and mounting of a sun visor of the type described above.

Another object of the invention is to assure the electrical connection between the lead wire to the light source on the visor and a lead wire leading away from the sun visor to the electrical system of a vehicle, or the like.

According to the invention, the outer support pivot pin is made integral with the support therefor, instead of being fabricated separately from the support and later being assembled together therewith. The support for the outer support pivot pin is preferably comprised of plastic. The combining of the plastic support and the outer support pivot pin into a single structural unit substantially simplifies the manufacture and the mounting of the electrified pivot for the sun visor body. The outer support pivot pin has an axial bore extending through it in which each lead wire to be connected to the light source might be inserted. A radially extending groove extends from the through bore radially out of the outer support pivot pin to the surface thereof.

A further feature of the invention comprises developing the plastic support integral with the reinforcing insert for the sun visor body. Such a development makes it necessary merely, in addition, to mount the contact elements on the outer support pivot pin.

The outer support pivot pin bears contact means, comprising at least one, and preferably two, contact elements, each of which is provided with a respective electric lead wire. Where the light source is grounded through the sun visor body and not through a connection past the outer support pivot pin, only one contact element is provided. Where the light source is grounded by a lead that communicates past the outer support pivot pin, two contact elements are provided. For more details as to this distinction, see application Ser. No. 866,992.

The contact elements of the outer support pivot pin are positively held in the undercut, radially extending grooves in the outer support pivot pin. The contact elements each engage a respective lead wire. The contact elements extend out of the groove and terminate flush with the outer surface of the outer support pivot pin or extend slightly beyond same.

In one preferred embodiment, each contact element is in the form of a slit sleeve. The longitudinal edges of the slit of the sleeve carry diverging arms that are integral with the sleeve. The arms extend out through the radial groove. The free longitudinal edge of each arm has an outwardly directed bend which is adapted to the radius of the outer support pivot pin. The electric lead wire can be pushed into the contact element sleeve and be held there by simple squeezing. Thereafter, the contact element is merely pressed or clamped into the undercut groove of the outer bearing pivot pin.

Alternatively, however, each contact element can be developed as a claw, which partially surrounds the outer support pivot pin. At least one of the free, inwardly bent or rolled, longitudinal edges of the claw penetrates into a radially extending groove that is provided in the outer support pivot pin and then contacts the electric wire that has been introduced into an axial borehole of the outer support pivot pin. In order to attach the claw, one of its bent longitudinal edges is, for instance, hooked into the radially extending groove and wrapped around the outer support pivot pin, and the other longitudinal edge is squeezed against the wire which is arranged concentrically within the outer support pivot pin. Since the outer support pivot pin is comprised of plastic and thus has a certain resiliency, the claw can be deformed with such an initial force as to assure permanent contact with the electric wire.

The contact element claw may also be of C-shape in cross-section and have its opposed longitudinal edges each pressed into a respective one of diametrically oppositely positioned, radially extending grooves formed in the outer support pivot pin. The longitudinal edges of the claw are pressed together and then contact the wire arranged in the axial borehole within the outer support pivot pin. In this embodiment, it is advisable for the longitudinal edges of the claws to be serrated, so that more favorable electric and mechanical contacting of the wire by the claw can be obtained.

Other objects and features of the invention are described below with reference to several embodiments of the invention which are shown in the accompanying drawings.

BRIEF DESCRIPTION OF THE DRAWINGS

FIG. 1 is an elevational view of a sun visor with internal parts thereof shown in broken lines.

FIG. 2 is a perspective view of the outer support housing of the sun visor shown in FIG. 1.

FIG. 3 is a perspective view of a plastic support provided with contact elements.

FIG. 4 is a detail of FIG. 3, showing a contact element.

DESCRIPTION OF THE PREFERRED EMBODIMENTS

Figure 5:
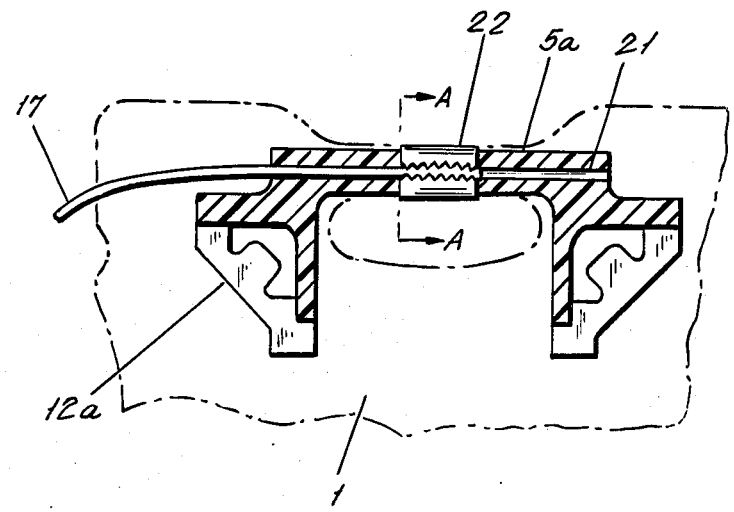
FIG. 5 is a cross-sectional elevational view of a second embodiment of a plastic support and of a second embodiment of a contact element.

The sun visor shown in FIG. 1 comprises a sun visor body 1 having an upper longitudinal edge 2. At the region of one end of the edge 2, there is a swivel bearing housing 3 attached to the body 1 and a sun visor pivot pin 4, which extends into the bearing housing 3 so that the bearing and thus the sun visor body may swivel around the pin 4. The pin 4 is attached to and supported by the body of a vehicle (not shown) in which the sun visor is placed.

Near the other end of the upper longitudinal edge 2 there is a depression 2a in the edge 2, in which is located an outer support. The support is comprised of the outer support pivot pin 5 that is integrally supported at both ends in a support 12 therefor position inside the body 1. The pin 5 extends across the depression 2a, outside the body 1. A separate outer support housing 6 is carried on the pivot pin 5.

On the side of the sun visor body 1 which faces toward the inside of vehicle when the sun visor is in its downwardly swung position, there is arranged a mirror 7. A source of light comprised of a small incandescent bulb 8 is associated with the mirror 7 and casts light in the vicinity of the mirror. By means of the swing cover 9, the mirror 7 can be covered. The incandescent bulb 8 is connected and disconnected by a switch (not shown), which can be actuated by the swing cover. Details as to this cover and the light switch are found in U.S. application Ser. No. 866,992, incorporated herein by reference.

The outer support housing 6 (FIG. 2) is provided with connection means comprised of two contacts 11 for electrical connection with the wires 10 of the electrical system (not shown) of the vehicle (not shown). The upper regions of the contacts 11 are developed as contact plugs and their lower regions are developed as contact springs. Connection of the contacts 11 with electric wires 17 leading to the source of light 8 (FIG. 1) is effected via contact elements 14 which are arranged on the outer support pivot pin 5 (FIGS. 3–4), in such a manner that contact is made at least when the sun visor body 1 is in its downwardly swung position. For further detail as to this, again refer to application Ser. No. 866,992.

The embodiment of an outer support pivot pin 5 shown in FIG. 3 is integral with a plastic support 12. The outer support pivot pin 5 has an undercut, radially extending groove 13, which extends radially out from a central, axial, longitudinally extending borehole in the support 12. The groove is defined between sidewalls defined in the pivot pin 5. Two separated contact elements 14 are arranged in the groove 13. One of the contact elements 14 is shown in FIG. 4 and is comprised of a longitudinally extending, electrically conductive slit sleeve 15 having integral arms 16 arranged on the longitudinal edges of the sleeve 15. The free ends of the arms 16 are bent outwardly at 16a. Each of the sleeves 15 receives the end of a respective electric wire 17, from the end of which the insulation has been removed. The required contact between the contact element 14 and the sleeve 15 can be effected by soldering, but is preferably obtained by strong squeezing along an inwardly deformed pressing zone 18. The shape of the contact elements 14 enables them to engage the wire 17 in a simple manner as they are being clamped into the undercut, radial groove 13. The outwardly bent tabs 16a of the contact elements 14 are flush with the outer surface of the outer support shaft 5 or extend slightly beyond same. The formation of a dependable contact, ultimately with the contact springs of contacts 11, is assured. Between the two contact elements 14 the radial groove 13 is interrupted by a web 19 which definitely separates the contact elements.

Instead of providing two contact elements 14, it is also possible to provide only a single contact element. This would be done when the inner frame 20 (shown in dashed lines) of the sun visor body 1 and the sun visor pivot pin 4, which is electrically connected to the inner frame 20, are comprised of metal. Again, see application Ser. No. 866,992 as to this. The ground contact is connected in this case from the body of the vehicle (not shown) via the sun visor pivot pin 4 and the inner frame 20 to the source of light 8.

In the case of a plastic reinforcing insert 20 that is developed, for instance, integrally with the plastic support 12, both the current lead wire and the ground wire are conducted over the outer support housing 6 to the source of light 8, as shown in FIG. 3. In this case, the electric wires 17, 17a, each of which is connected to a respective contact element 14, extend within the body 1 of the sun visor directly to the source of light 8.

Figure 6:
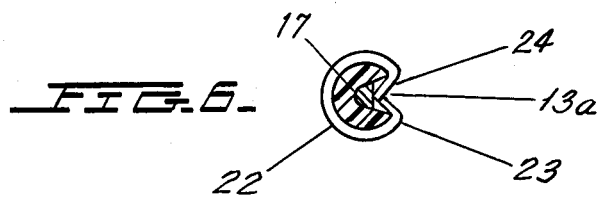
FIG. 6 is a section along the line A—A of FIG. 5.

FIGS. 5 and 6 show another embodiment of an outer support pivot pin 5a which is integral with a plastic support 12a. The outer support pivot pin 5a has an axial, longitudinally extending borehole 21 extending through it and a radially extending groove 13a opening into the borehole. A single electric wire 17 is inserted into the axial borehole 21. In this embodiment, therefore, only one wire extends from the vehicle electrical system to the light source. The other contact of the light source extends to ground through the body of the sun visor. The wire 17 in the borehole 21 is contacted by a contact element that is developed as a claw 22. This claw replaces the contact elements 14 of the first embodiment. In an alternative two wire arrangement, two separate claws 22 would be used, and each would contact a respective wire 17. The illustrated claw 22 is of approximately circular cross-section and includes inwardly bent integral lugs 23, 24 that each extend from a respective edge of the claw 22 into the radial groove 13a and that each extend the length of the claw 22. The shorter radial length lug 23 extends into and is suspended in the radial groove 13a. The free longitudinal edge of the longer radial length lug 24 is forced so deeply into the radial groove 13a that it definitely makes contact with the electric wire 17. The free inward edges of the lugs 23 and 24 are serrated. The lugs 23 and 24 are guided and positioned by the sidewalls of the radial groove.

Figure 7:
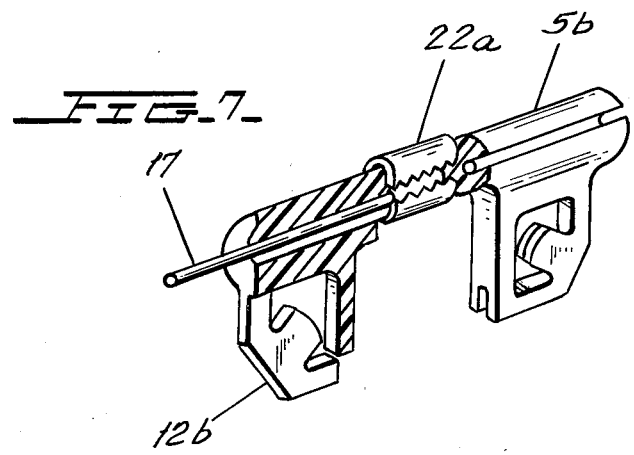
FIG. 7 is a perspective view of a third embodiment of a plastic support, shown partially in section and of a third embodiment of a contact element.

FIG. 7 shows an outer support shaft 5b which is integral with a plastic support 12b. The embodiment of FIG. 7 differs from that of FIG. 5 in that there are two diametrically opposite, radially extending grooves in the central part of the outer support pivot pin 5b and communicating with the axial borehole for the wire. An approximately C-shaped claw 22a is provided, having opposed longitudinal edges, each of which is introduced into a respective one of the radially extending grooves and at least one of which, and preferably both of which, contacts the electric wire 17 located between the longitudinal edges of the claw 22a. In this case, the longitudinal edges of the claw 22a are preferably serrated. Again, a single wire embodiment is illustrated, but it can be adapted to two wires, by providing two claws 22a and a respective wire 17 for each.

Although the present invention has been described in connection with a plurality of preferred embodiments thereof, many variations and modifications will now become apparent to those skilled in the art. It is preferred, therefore, that the present invention be limited not by the specific disclosure herein, but only by the appended claims.

We claim:

1. Sun visor for a vehicle, or the like, comprising:

a sun visor body; said visor body having an upper longitudinal edge;

a light source on said sun visor body; a first current lead wire and a ground wire both being connected to said light source;

an outer support pivot pin located in the region of one end of said upper edge of said visor body; a support for said pivot pin and being located in said visor body for positioning said pivot pin stationary in location; first contact means on said outer pivot pin; said first current lead wire being connected to said first contact means;

an outer support housing, having a longitudinally extending socket means into which said pivot pin is pivotingly, detachably emplaced; second contact means on said support housing for engaging said first contact means when said pivot pin is in said socket means; connection means on said support housing for connecting a second electric wire of a vehicle, or the like, to said second contact means;

a third electric wire; said pivot pin having a longitudinally extending bore therein shaped for receiving and holding therein said third electric wire that is separate from said pivot pin and that extends longitudinally through said bore and is also located wholly within said bore along the length of said pivot pin; a radially extending groove into said pivot pin and communicating from the exterior of said pivot pin to said bore and extending longitudinally along said pivot pin; said groove being defined by sidewalls in said pivot pin;

said first contact means comprising a contact element held in said groove and extending into said groove to contact said third electric wire therein, and terminating outside said pivot pin for engaging said first contact means in said socket means.

2. The sun visor of claim 1, wherein said outer support housing is comprised of plastic material.

3. The sun visor of claim 1, further comprising a mirror supported on said visor body, and said light source being positioned to cast illumination in the vicinity of said mirror.

4. The sun visor of claim 1, wherein said pivot pin support is comprised of plastic.

5. The sun visor of either of claims 1 or 4, wherein said visor body has a reinforcing insert, and said pivot pin support is integral with said reinforcing insert.

6. The sun visor of claim 1, wherein said contact element comprises a longitudinally extending, electrically conductive sleeve positioned in said bore; said sleeve being in engagement with said said third electric wire; said sleeve having a longitudinal slit defined therein; an electrically conductive arm at each side of said slit, and projecting from said sleeve out of said pin through said groove; each said arm including an outer portion outside said groove and said pin; said arm outer portions engaging said first contact means when said pivot pin is in said socket means.

7. The sun visor of claim 6, wherein said outer portion of each said arm is bent over and is adapted generally to the radius of said pivot pin.

8. The sun visor of claim 7, wherein said sleeve has edges that define said slit; each said arm is at a respective said sleeve edge; said arms diverge, moving outwardly from said sleeve, and are so shaped with respect to said groove as to be urged towards each other by said sidewalls defining said grooves.

9. The sun visor of claim 1, wherein said contact element comprises a generally C-shaped longitudinally extending claw wrapped around said pivot pin; said claw having respective longitudinal edges; at least one of said longitudinal edges of said claw projects into said groove far enough to engage said third electric wire therein; the portion of said claw wrapped around said pivot pin engages said second contact means when said pivot pin is in said socket means.

10. The sun visor of any of claims 1, 6 or 9, wherein said pivot pin is pivotally supported in said socket means and is adapted to pivot therein.

11. The sun visor of any of claims 1, 6 or 9, further comprising a swivel support for said visor body at said upper longitudinal edge thereof and said swivel support being spaced away from said sun visor pivot pin.

12. The sun visor of claim 9, wherein both said longitudinal edges of said claw project into said groove, while at least one of said longitudinal edges contacts said third electric wire; said longitudinal edges of said claw engage said groove side walls, thereby positioning said claw.

13. The sun visor of claim 9, wherein there are two said radially extending grooves in said pivot pin and being spaced apart around said pivot pin; each said longitudinal edge of said claw extends into a respective one of said grooves and at least one of said longitudinal edges extends to said third electric wire.

14. The sun visor of claim 13, wherein said two grooves are at diametrically opposite positions around said pivot pin.

15. The sun visor of any of claims 1, 6, or 9, wherein there are two said contact elements in said pivot pin and spaced apart from each other.

16. The sun visor of claim 15, further comprising a separate respective said third electric wire for each said contact elements and said third electric wires being in said bore of said pivot pin.

17. The sun visor of claim 16, wherein said second contact means comprises a respective contact on said outer support housing for each said contact element.

18. The sun visor of claim 1, wherein said contact element is rigid enough, yet sufficiently deformable, and said radially extending groove is so shaped and said contact element is so shaped that said contact element is form-locked in said groove such that the walls of said pivot pin defining said groove urge said contact element into engagement with said third electric wire.

* * * * *